May 7, 1968  F. T. CARTER  3,381,995
TRUCK BODY SECURING MEANS
Filed May 23, 1966  2 Sheets-Sheet 1
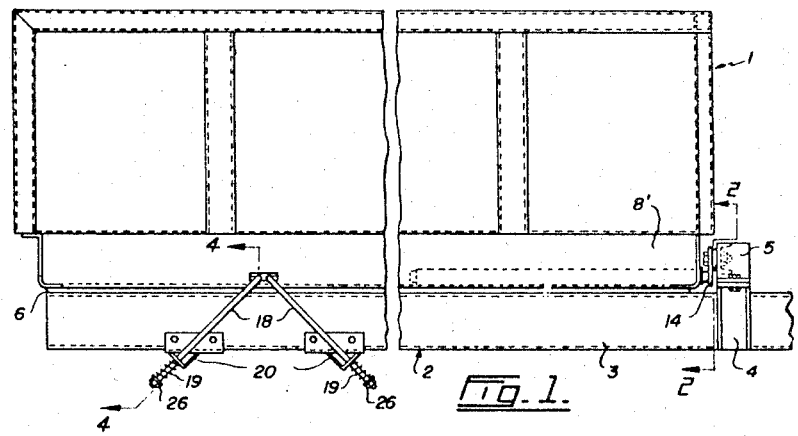
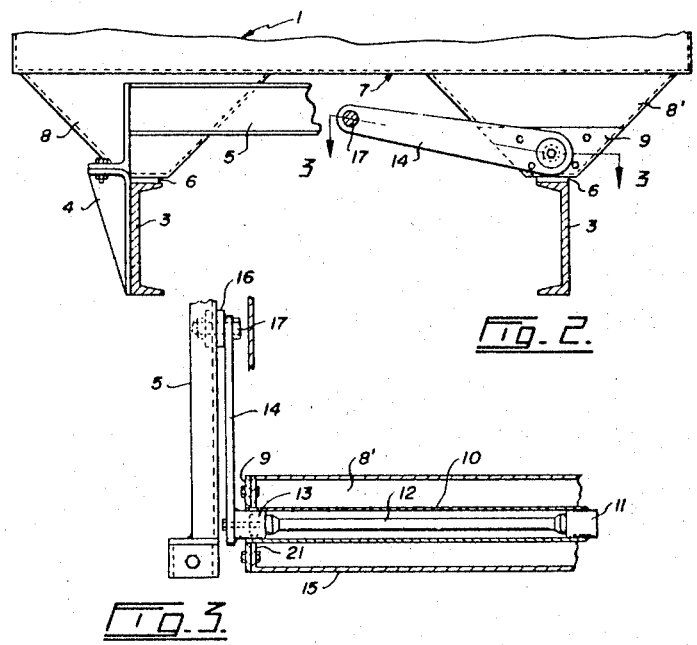

May 7, 1968 F. T. CARTER 3,381,995
TRUCK BODY SECURING MEANS
Filed May 23, 1966 2 Sheets-Sheet 2
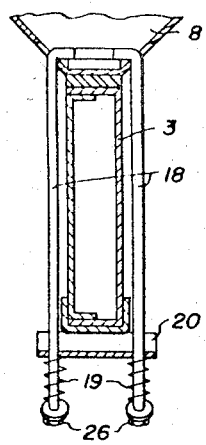
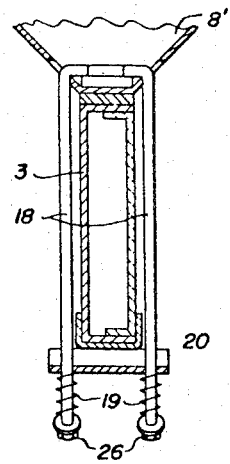
Fig. 4.
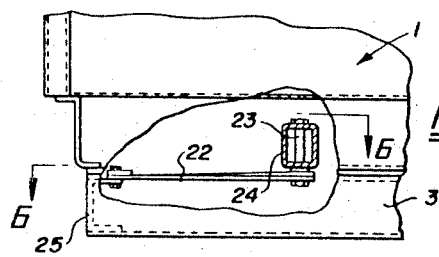
Fig. 5.
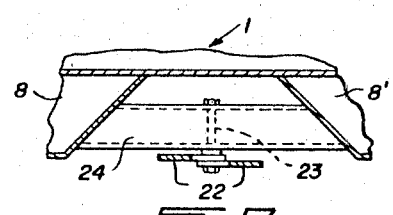
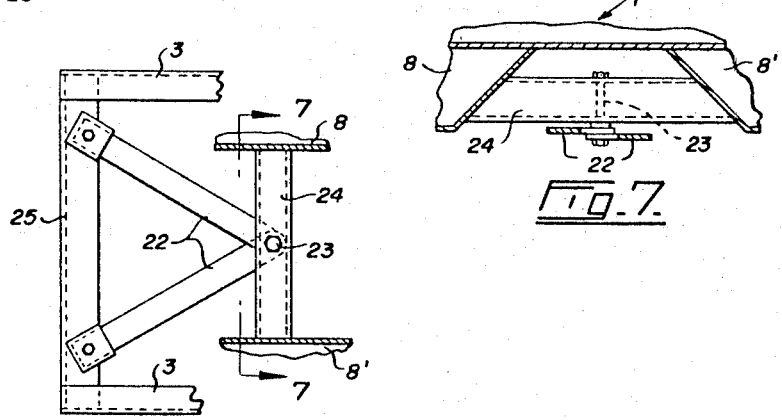
Fig. 7.
Fig. 6.

United States Patent Office 3,381,995
Patented May 7, 1968

3,381,995
TRUCK BODY SECURING MEANS
Franklin Thomas Carter, 35 University Ave.,
Waterloo, Ontario, Canada
Filed May 23, 1966, Ser. No. 552,207
Claims priority, application Canada, June 3, 1965,
932,412
4 Claims. (Cl. 296—35)

ABSTRACT OF THE DISCLOSURE

A means for holding a truck body onto a chassis consisting of a torsion bar assembly between the front end of the body and the chassis and a coil or leaf spring assembly between the rear end of the body and the chassis.

---

This invention relates to apparatus for securing a truck body to a chassis and more particularly to such apparatus which will permit relative movement to occur between the chassis and body to avoid subjecting either to excessive strain during use.

A truck chassis is generally produced by one manufacturer while a different manufacturer supplies the body. With this arangement the purchaser of a truck is able to specify the combination of chassis and body which will best suit his requirements.

A chassis is normally made so that it will be torsionally flexible so reducing the possibility of failure due to overstressing.

On the other hand, a truck body is often structurally stiffer than a chassis particularly when subjected to torsional stresses. For instance, a dump box type body is usually constructed of reinforced plate sides and a reinforced plate bottom and such a structure will usually be much more torsionally stiff than a chassis.

Obviously if such a stiff body is rigidly attached to a truck chassis the body will attempt to flex with the chassis, while the chassis will be at least partially held against flexing by the body. The body will therefore be prone to failure through excessive flexing while the chassis will be prone to failure by overstressing of the chassis parts which are held against normal movement by the body.

Accordingly it has long been the practice to secure a body to a truck chassis with means which permit a limited amount of relative movement between the body and chassis while maintaining the body in its proper position relative to the chassis.

In the past, such means for securing the body to the chassis have included spring loaded U-bolts. Although this arrangement is normally satisfactory for relatively level road haulage it has been found that when using a truck off the road, premature failure of the body or chassis has often occurred. This is normally because of the limited amount of relative movement permitted between the body and the chassis by such as arangement, the movement permitted normally being only of the order of 1 to 2 inches.

For "off road" use there is therefore a need for some means for attaching a body to a chassis, which will permit a much larger relative movement between the body and chassis so as to reduce to a minimum the possibility of excessive stresses being set up in either the body or chassis. Such means must also be capable of properly poitioning the body on the chassis at all times, must be of a reasonably simple structure so as to be reliable over long periods of time and be economically feasible.

It has been previously suggested that a larger relative movement between a truck body and a chassis could be permitted by using a securing means comprised of U-bolts and springs which are much longer than those which would normally be used. However, this type of securing means is not practical as the longer U-bolts can only be accommodated at the expense of a reduction in ground clearance, and any limitations in this area cannot normally be tolerated.

One object of this invention is therefore to provide a means for securing a truck body to a chassis which will permit a relative movement between the truck body and chassis of a large enough magnitude to minimize the possibility of creating excessive stresses under severe operating conditions.

Another object of this invention is to provide a means for positioning a truck body on a chassis, which will also permit a large relative movement between the truck body and chassis.

With these main objects in mind, this invention consists of a securing means for attaching a body to a chassis which permits approximately 7 to 8 inches of relative vertical movement to occur at the front end of the chassis and approximately 1 to 2 inches of vertical movement and pivoting to occur at the rear end of the chassis.

The securing means is inexpensive and can be fitted to a vehicle without having to make any major alterations to a standard body or chassis. It is simple in its operation, reliable and is designed to allow any maintenance or servicing to be easily and quickly carried out on the work site.

This novel securing means comprises, generally speaking, a torsion bar as the front securing means, one end of the bar being secured to the chassis and the other end being secured to the body by suitable linkage; and U-bolts or leaf springs as the rear securing means.

Preferred embodiments of the invention will now be described with reference to the accompanying drawings in which:

FIGURE 1 is a side elevation of a truck body and chassis with a securing means according to the present invention.

FIGURE 2 is a sectional elevation of the truck body and chassis along line 2—2 of FIGURE 1.

FIGURE 3 is a view of the torsion bar assembly along line 3—3 of FIGURE 2.

FIGURE 4 is a sectional view showing the U-bolt mounting along line 4—4 of FIGURE 1.

FIGURE 5 is a side elevation of the truck body and chassis, partly sectioned, showing an alternative leaf spring mounting means.

FIGURE 6 is a plan view along line 6—6 of FIGURE 5.

FIGURE 7 is a sectional elevation along line 7—7 of FIGURE 6.

Referring to FIGURE 1, a truck body 1 is mounted on a conventional chassis 2. Near the front end of the chassis side members 3 are attached brackets 4 which support a cross member 5. The truck body 1 rests on the side members 3 with a cushioning strip 6 of rubber or the like positioned along the upper surface of the side member 3.

The truck body 1 has a bottom 7 with longitudinal box sections 8 and 8' secured to it along either side of the bottom 7. These box sections 8 and 8' support the body 1 on the chassis 2 and add structural strength to the body 1.

A torsion bar assembly 15 as detailed in FIGURE 3, is fastened inside the box section 8'. The torsion bar assembly 15 comprises mounting plate 9 welded to one end of a pipe 10 having a socket 11 welded inside its other end. A torsion bar 12 has one end secured in the socket 11, and the other end secured to a boss 13 to which is welded an arm 14. The boss 13 is free to rotate in the pipe 10, the pipe functioning as a bushing.

The torsion bar assembly 15 is attached between box section 8' and the cross member 5. The pipe 10 of the assembly 15 is slid through a hole in the front wall 21 of the box section 8' and attached to the wall 21 by bolting the mounting plate 9 onto the wall 21. The free end of the arm 14 is secured by a nut and bolt 17 to approximately the transverse centre of the cross member 5, with a resilient bushing 16 being positioned between the bolt and the cross member.

The torsion bar 12 will normally be pre-loaded during assembly to provide a holding force to keep the truck body 1 substantially in contact with the chassis 2 under highway driving.

FIGURES 1 and 4 show means for holding down the rear of the truck body 1 to the chassis 2, and in this embodiment comprises a pair of U-bolts 18, on each side of the body. The U-bolts 18 are positioned at an angle to the vertical, the transverse bight portions of the bolts 18 passing through holes in the box sections 8 and 8' while the threaded ends of the bolts 18 pass through holes in mounting brackets 20 which are bolted onto the respective side members 3. Nuts 26 on the ends of the U-bolts 18 hold and compress springs 19 between the mounting brackets 20 and the nuts 26. Such a positioning of the U-bolts 18 allows vertical movement between the body and chassis with only very slight longitudinal movement. The springs 19 will be pre-loaded during assembly to normally hold the truck body 1 in contact with the chassis.

An alternative holding means for the rear of the truck body is shown in FIGURES 5, 6 and 7 where a pair of leaf springs 22 have one end fastened to a common point underneath the truck body at 23, on a cross member 24 which is welded between the box sections 8' and 8'. The opposite ends of the leaf springs 22 are bolted separately to widely spaced points on a transverse member 25 of the chassis 2. No resilient connections are required on either end of the leaf springs 22 as it is intended that very little movement shall occur at these attachment points. The leaf spring attachment means holds the body in a longitudinal position with respect to the chassis, while allowing 1 to 2 inches of vertical movement to occur between the body and chassis.

Both these rear attachments will allow pivoting of the body to occur with respect to the chassis, while the front torsion bar assembly allows 7 to 8 inches of vertical movement to occur with negligible transverse movement.

It is also to be understood that a pair of torsion bar assemblies can be used, one being fitted in each of the box sections 8 and 8', although in practice, one torsion bar has been found to be quite adequate.

Although the torsion bar assembly is secured to the front end of the body it should be appreciated that torsion bar assemblies could be secured to the front and rear of the body or the torsion bar assembly could be secured to the rear of the body, while the pivotable spring attachment could be secured to the front of the body.

Alternatively the torsion bar assembly could be secured to the chassis there being no intention to limit the invention to the form specifically shown in the figures where the torsion bar assembly is secured to the body.

The above are preferred embodiments only of the present invention, and it can readily be appreciated that various forms of securing means fall within the ambit of the present teachings as specifically claimed.

I claim:

1. A torsion bar assembly for securing one end of a truck body to a chassis comprising a tube rigidly mounted longitudinally at the underside of the body with one end of the tube being at the front end of the body; a torsion bar located partly inside said tube, the bar being freely rotatable in said one end of said tube and being rigidly secured at the other end of said tube; and an arm rigidly secured by one of its ends to the freely rotatable end of said bar and pivotally mounted by its other end to the chassis.

2. A torsion bar assembly as in claim 1, wherein a boss is provided at said one end of said arm, said boss being rotatable in said one end of said tube; and a socket is provided at said other end of said tube to accommodate the rigidly secured end of said bar.

3. In combination, a truck body, a chassis and means for securing said body to said chassis so as to permit relative substantially vertical movement between the body and the chassis while correctly locating the body on the chassis; said securing means including a torsion bar assembly which is operably secured between the front end of the body and the chassis so that relative substantially vertical movement between the body and the chassis increases the torque exerted by the torsion bar assembly, and means for attaching the other end of the body to the chassis so as to permit limited movement between said other end of the body and the chassis; the torsion bar assembly consisting of a tube rigidly mounted longitudinally at the underside of the body with one end of the tube being at the front end of the body, a torsion bar located partly inside said tube, the bar being freely rotatable in said one end of said tube and being rigidly secured at the other end of said tube, and an arm rigidly secured by one of its ends to the freely rotatable end of said bar and pivotally mounted by its other end to the chassis.

4. In combination, a truck body, a chassis and means for securing said body to said chassis so as to permit relative substantially vertical movement between the body and the chassis while correctly locating the body on the chassis; said securing means including a torsion bar which is operably secured between one end of the body and the chassis so that relative substantially vertical movement between the body and the chassis increases the torque of said torsion bar, and means for attaching the other end of the body to the chassis, said attaching means including a pair of spring biased U-bolts located on either side of the body, each pair of U-bolts having a mounting point on the body which is common to their bight portions while the free ends of each pair are attached to widely spaced mounting plates on the chassis, said bolts holding the body in contact with the chassis and permitting limited substantially vertical movement and pivoting to occur between the body and the chassis.

References Cited

UNITED STATES PATENTS

| | | | |
|---|---|---|---|
| 1,495,171 | 5/1924 | Fraser | 280—106.5 |
| 2,708,133 | 5/1955 | Sewelin et al. | 296—35 |
| 2,708,134 | 5/1955 | Sewelin et al. | 296—35 |
| 2,721,616 | 10/1955 | Rocha | 296—35 X |
| 3,161,251 | 12/1964 | Kraus | 280—124 X |
| 3,177,032 | 4/1965 | Jaskowiak | 296—35 |

FOREIGN PATENTS

| | | |
|---|---|---|
| 622,197 | 2/1927 | France. |
| 929,171 | 6/1963 | Great Britain. |

BENJAMIN HERSH, *Primary Examiner.*

J. A. PEKAR, *Assistant Examiner.*